United States Patent
Chakravarty (10) Patent No.: US 8,464,198 B1
(45) Date of Patent: Jun. 11, 2013

(54) ELECTRONIC DESIGN AUTOMATION TOOL AND METHOD FOR EMPLOYING UNSENSITIZED CRITICAL PATH INFORMATION TO REDUCE LEAKAGE POWER IN AN INTEGRATED CIRCUIT

(75) Inventor: Sreejit Chakravarty, Mountain View, CA (US)

(73) Assignee: LSI Corporation, Milpitas, CA (US)

( * ) Notice: Subject to any disclaimer, the term of this patent is extended or adjusted under 35 U.S.C. 154(b) by 1069 days.

(21) Appl. No.: 12/182,330

(22) Filed: Jul. 30, 2008

(51) Int. Cl.
*G06F 17/50* (2006.01)

(52) U.S. Cl.
USPC ............ 716/132; 716/106; 716/109; 716/133

(58) Field of Classification Search
USPC .................. 716/100–109, 132–133
See application file for complete search history.

(56) References Cited

U.S. PATENT DOCUMENTS

| | | | | |
|---|---|---|---|---|
| 5,774,367 | A * | 6/1998 | Reyes et al. | 716/108 |
| 7,451,413 | B1 * | 11/2008 | Sutardja | 716/100 |
| 2003/0067318 | A1 * | 4/2003 | Takahashi et al. | 324/765 |
| 2004/0230924 | A1 * | 11/2004 | Williams et al. | 716/2 |
| 2005/0091629 | A1 * | 4/2005 | Eisenstadt et al. | 716/13 |
| 2005/0172251 | A1 * | 8/2005 | Chang et al. | 716/6 |
| 2007/0007996 | A1 * | 1/2007 | Ranganathan et al. | 326/34 |
| 2009/0271746 | A1 * | 10/2009 | Drapa | 716/2 |

OTHER PUBLICATIONS

Gordon L. Smith, "Model for Delay Faults Based Upon Paths" Proc. Int'l. Test Conference, Nov. 1985.
Chin Jen Lin, et al., "On Delay Fault Testing in Logic Circuits" IEEE Transactions on Computer-Aided Design, vol. CAD-6, No. 5, pp. 694-703, Sep. 1987.
Karl Fuchs, et al., "Dynamite: An Efficient Automatic Test Pattern Generation System for Path Delay Faults" IEEE Transactions on Computer-Aided Design, vol. 10, No. 10, pp. 1323-1335, Oct. 1991.
Kwang-Ting Chen, et al., "Classification and Identification of Nonrobust Untestable Path Delay Faults" IEEE Transactions on Computer-Aided Design of Integrated Circuits and Systems, vol. 15, No. 8, pp. 845-853, Aug. 1996.

* cited by examiner

Primary Examiner — Paul Dinh (57) ABSTRACT

An electronic design automation (EDA) tool and a method of employing unsensitized critical path information to reduce leakage power in a circuit. In one embodiment, the EDA tool includes: (1) an unsensitizable path identifier configured to receive information regarding designed devices in a circuit and information regarding identified critical paths therein, analyze a logical behavior of the circuit and identify critical and noncritical gates in unsensitizable ones of the critical paths thereof and (2) a transistor designator coupled to the unsensitizable path identifier and configured to designate relatively low threshold voltage transistors for use in the critical gates and designate relatively high threshold voltage transistors for use in the noncritical gates.

20 Claims, 7 Drawing Sheets

FIG. 1A

| PATH NAME | PATH | STA/SSTA CRITICAL? | SENSITIZABLE? |
|---|---|---|---|
| p1 | a, G1, G2, G3, G4, c | NO | YES |
| p2 | a, G1, G2, G3, G6, d | NO | YES |
| p3 | a, G1, G2, G3, G6, G4, c | YES | YES |
| p4 | a, G1, G2, G5, G9, G10, e | YES | YES |
| p5 | b, G7, G8, G9, G10, e | NO | YES |
| P6 | b, G7, G8, G9, G12, f | NO | YES |
| P7 | b, G7, G11, G9, G10, e | NO | YES |
| p8 | b, G7, G8, G5, G9, G12, f | YES | NO |

ELECTRONIC DESIGN AUTOMATION TOOL AND METHOD FOR EMPLOYING UNSENSITIZED CRITICAL PATH INFORMATION TO REDUCE LEAKAGE POWER IN AN INTEGRATED CIRCUIT

TECHNICAL FIELD

The invention is directed, in general, to integrated circuits (ICs) and, more specifically, to an electronic design automation (EDA) tool and method for employing unsensitized critical path information to reduce leakage power in a circuit.

BACKGROUND

Conserving resources, including energy, has become a preeminent objective in today's world. Manufacturers of electronic circuits, and especially ICs, are sensitive to the need to improve the energy efficiency of their products. Given the ever-decreasing size of transistors (e.g., complementary metal-oxide semiconductor field-effect transistors) in modern ICs, leakage power has become a major source of inefficiency. Therefore, a variety of techniques are being pursued to reduce leakage power. One way to reduce leakage power is to raise transistor threshold voltage, or $V_t$. However, since $V_t$ and transistor switching speed bear a generally inverse relationship, raising $V_t$ slows overall IC performance. Thus $V_t$ cannot be raised indiscriminately.

For this reason, EDA tools have recently been introduced that use structural static timing analysis (STA) to identify critical paths (the longest and therefore the most speed-sensitive logic paths) in an IC. The EDA tools then raise the $V_t$ of only the transistors that lie outside of those critical paths. This solution, called "multi-$V_t$ optimization," is proving effective at reducing leakage power without sacrificing IC speed.

SUMMARY

One aspect of the invention provides an EDA tool. In one embodiment, the EDA tool includes: (1) an unsensitizable path identifier configured to receive information regarding designed devices in a circuit and information regarding identified critical paths therein, analyze a logical behavior of the circuit and identify critical and noncritical gates in unsensitizable ones of the critical paths thereof and (2) a transistor designator coupled to the unsensitizable path identifier and configured to designate relatively low threshold voltage transistors for use in the critical gates and designate relatively high threshold voltage transistors for use in the noncritical gates.

In another embodiment, the EDA tool includes: (1) an unsensitizable path identifier configured to receive information regarding designed devices in an integrated circuit and information regarding critical and noncritical paths therein identified in a timing analysis thereof, analyze a logical behavior of the integrated circuit and identify critical and noncritical gates in unsensitizable ones of the critical and noncritical paths thereof and (2) a transistor designator coupled to the unsensitizable path identifier and configured to designate relatively low threshold voltage transistors for use in the critical gates and designate relatively high threshold voltage transistors for use in the noncritical gates.

Another aspect of the invention provides a method of employing unsensitized critical path information to reduce leakage power in a circuit. In one embodiment, the method includes: (1) analyzing a logical behavior of the circuit, (2) identifying critical and noncritical gates in unsensitizable critical paths of the circuit, (3) designating relatively low threshold voltage transistors for use in the critical gates and (4) designating relatively high threshold voltage transistors for use in the noncritical gates.

The foregoing has outlined certain aspects and embodiments of the invention so that those skilled in the pertinent art may better understand the detailed description of the invention that follows. Additional aspects and embodiments will be described hereinafter that form the subject of the claims of the invention. Those skilled in the pertinent art should appreciate that they can readily use the disclosed aspects and embodiments as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION OF CERTAIN ASPECTS AND EMBODIMENTS

Described herein are various embodiments of an EDA tool and method for employing unsensitized critical path information to reduce leakage power in a circuit. Cells having a higher threshold voltage, $V_t$, have a lower leakage power than those having a lower threshold voltage, but cannot propagate transitions as quickly. Because the converse is also true, a tradeoff exists between leakage power dissipation and speed. Conventional multi-$V_t$ optimization reduces the overall leakage power in a circuit by employing transistors having a relatively high $V_t$ where speed is not critical. However, it will be shown below that the techniques used by conventional multi-$V_t$ optimization to identify where such transistors can be employed are inadequate. It will be shown herein that such higher $V_t$ transistors may be used to a far greater extent. Consequently, the leakage power and therefore the overall power consumption of the circuit, including an IC, can be reduced, perhaps significantly.

Figure 1A:
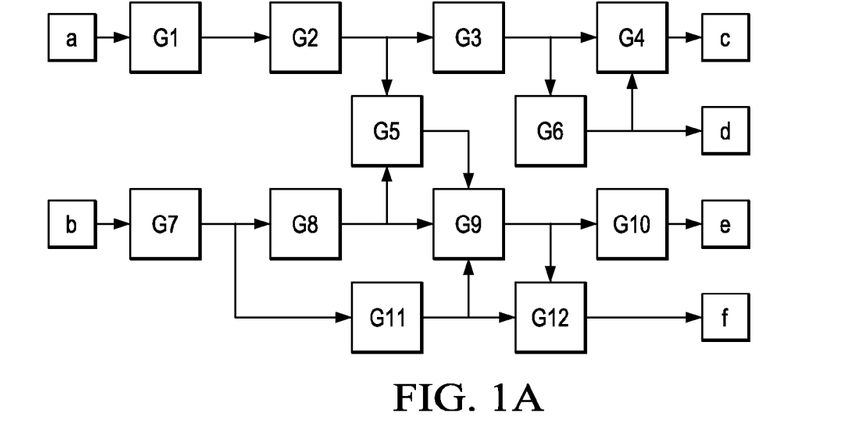
FIG. 1A is a block diagram of a combinatorial circuit that provides a more general example for contrasting conventional multi-$V_t$ optimization with multi-$V_t$ optimization carried out according to the principles of the invention.
Figure 1B:
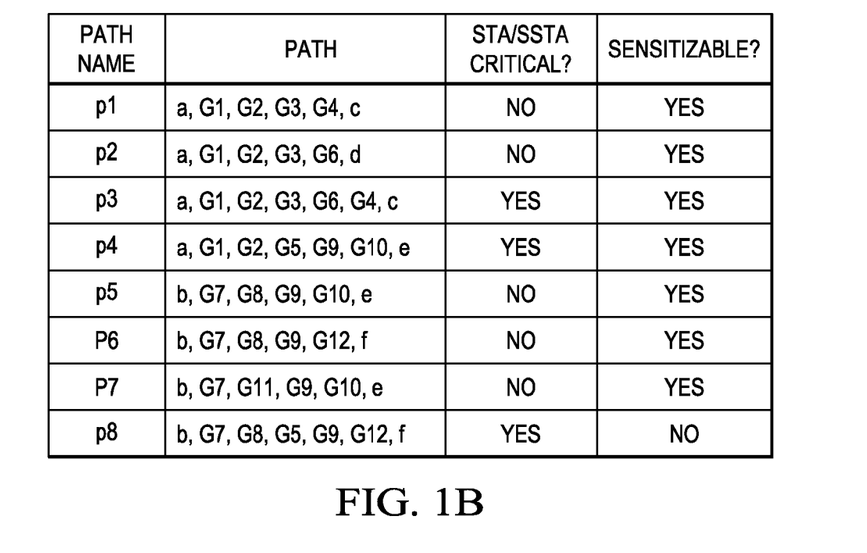
FIG. 1B is a table of paths existing within the combinatorial circuit of FIG. 1A.

FIG. 1A is a block diagram of a combinatorial circuit that provides a more general example for contrasting conventional multi-$V_t$ optimization with multi-$V_t$ optimization carried out according to the principles of the invention. The combinatorial circuit includes gates G1-G12 interconnected as shown and having inputs a, b and outputs c, d, e, f. STA and SSTA are conventionally employed to identify critical paths in circuits and may therefore be used to identify critical paths in the combinatorial circuit of FIG. 1A. Referring to FIG. 1B, illustrated is a table of paths p1-p8 existing within the combinatorial circuit of FIG. 1A. It is assumed that STA and/or SSTA have been performed on the combinatorial circuit, resulting in three paths p3, p4 and p8 being identified as critical. As the table of FIG. 1B shows, the path p3 begins at the input a, passes through gates G1, G2, G3, G6, G4 and ends at the output c; the path p4 begins at the input a, passes through gates G1, G2, G5, G9, G10 and ends at the output e; and the path p8 begins at the input b, passes through gates G7, G8, G5, G9, G12 and ends at the output f. Thus, the gates G1-G10, G12 lie in at least one critical path.

The only gate in the combinatorial circuit that does not lie in at least one of the critical paths p3, p4, p8 is the gate G11. Defining a "critical transistor" as a transistor lying in at least one critical path, and concomitantly defining a "noncritical transistor" as a transistor lying outside of all critical paths), conventional multi-$V_t$ optimization would designate only the transistors in the gate G11 as appropriate to be relatively high $V_t$ and relegate all other transistors in the combinatorial circuit to be relatively low $V_t$ in order to preserve the circuit's overall speed. Unfortunately, this approach is too conservative.

The success of multi-$V_t$ optimization ultimately depends on the number of noncritical transistors in the circuit and the tolerance individual non-critical paths have to increases in transition propagation latency, called "slack." Identifying a larger number of noncritical transistors should therefore improve multi-$V_t$ optimization. According to the principles of the invention, the sensitizability of the paths in a circuit should also be taken into account in determining whether transistors in that path qualify to be higher $V_t$. Specifically, transistors lying outside of only paths that are both critical and sensitizable should qualify to be higher $V_t$.

Formally speaking, a path is defined to be sensitizable if there exists an input vector such that all the side-inputs along the path are non-controlling values when the corresponding on-input propagates a non-controlling value. Stated another way, a path is sensitizable if its side inputs can be set to some value such that a value applied to its input is able to propagate to its output. Various references discuss path sensitization in general, e.g., Smith, "Model for Delay Faults Based Upon Paths," Proc. Int'l Test Conf., November 1985; Lin, et al., "On Delay Fault Testing in Logic Circuits," IEEE Trans. on CAD, Vol. 6, No. 5, September 1987; Schulz, et al., "Advanced Automatic Test Pattern Generation Techniques for Path Delay Faults," Proc. 19th Int'l Symposium on Fault Tolerant Computing, June 1989; and Cheng, et al., "Classification and Identification of Non-Robust Un-Testable Path Delay Faults," IEEE Trans. on CAD of IC and Systems, Vol. 15, No. 8, August 1996. Cheng, et al., correctly observe that an unsensitizable path has no bearing on circuit delay, but do not use that observation to address issues regarding power consumption.

Referring to the table of FIG. 1B, it is assumed for the purposes of this example that paths p1-p7 are sensitizable; only path p8 is unsensitizable. Thus, the only paths that are both critical per STA and/or SSTA and sensitizable are the paths p3, p4, which include the gates G1-G6, G9, G10.

Accordingly, not only does the gate G11 qualify to be higher $V_t$ (as it did under conventional multi-$V_t$ optimization), but the gates G7, G8 and G12 do as well. Depending on the slack on the paths p5-p7, the transistors in the gates G7, G8, G12 also qualify for higher $V_t$ versions.

Figure 2A:
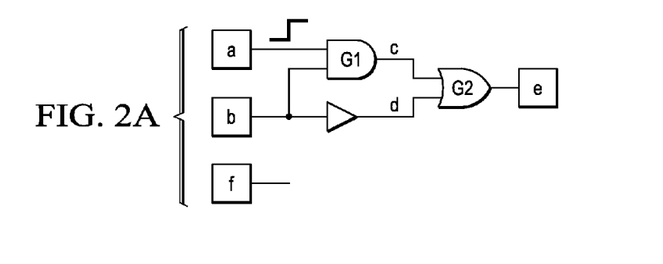
FIGS. 2A-D are schematic diagrams of a combinatorial circuit that provides more specific examples for describing identification of unsensitizable paths according to the principles of the invention.

FIGS. 2A-D are schematic diagrams of a combinatorial circuit that provides more specific examples for describing identification of unsensitizable paths according to the principles of the invention. Referring to FIG. 2A, inputs a, b, f are provided. The inputs a, b are coupled as shown to an unreferenced NOT gate, an AND gate G1 and an OR gate G2 to provide an output e.

It has been found that relying on STA and/or SSTA alone to identify critical transistors is inappropriate in that STA and SSTA analyze a circuit from a purely structural standpoint; they do not take into account the logical behavior of the circuit. For example, it will be assumed that a path p1 beginning at the input a, passing through the gate G1, the node c and the gate G2 and ending at the output e, is critical. However, it will now be shown that the path p1 is unsensitizable by virtue of its logical structure.

Figure 2B:
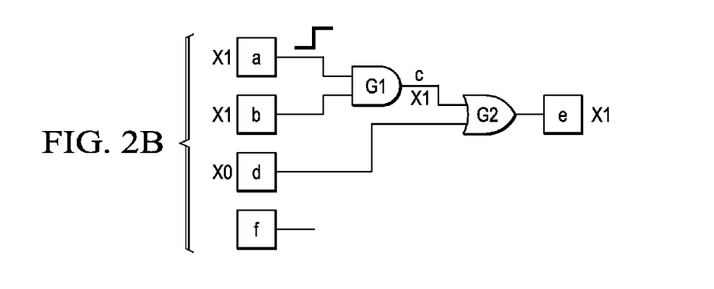

Referring to FIG. 2B, and given that the input b and the node d are side inputs to the path p1, a transition from any logical state to a logical zero cannot propagate, because the gate G1 is an AND gate. If a transition from any logical state to a logical one (denoted "X1") is presented at the input a, a similar transition must be presented at the side-input b for the transition at the node c to be X1. However, due to the presence of the unreferenced inverter, the transition at the node d must be X0 if the transition at the input d is X1. The transition X0 at the node d prevents the transition X1 at the node c from propagating through the gate G2 to the output e. Thus, there is no vector that can be presented at the side-inputs b, d to the path p1 that would allow any transition presented at the input to propagate to the output e. The path p1 is unsensitizable.

A path is theoretically sensitizable when a vector exists that allows a transition at the input of a path to propagate to its output. However, logical constraints may prevent that vector from ever occurring during the operation of the circuit in which that path is located. A path is therefore functionally unsensitizable if a value applied to the path's input cannot propagate to its output given any input vectors that may exist during the operation of the circuit in which the path is located. Two different ways to determine whether or not a path is sensitizable will be described. The first, a combinational analysis, identifies theoretically sensitizable paths and may be regarded as more robust. The second, a sequential analysis, identifies functionally sensitizable paths and is more aggressive.

Figure 2C:
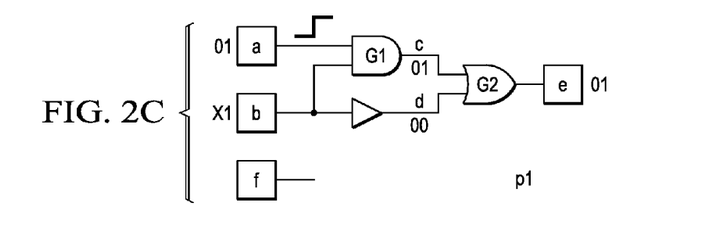
Figure 2D:
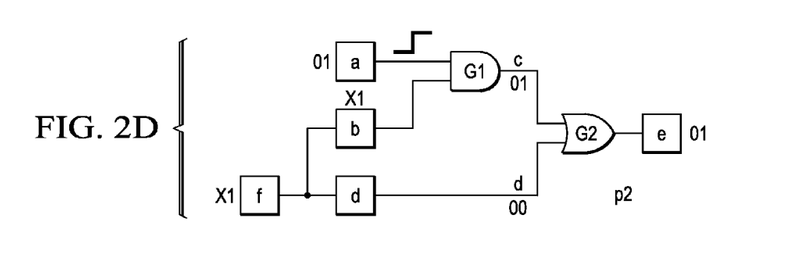

FIGS. 2C and 2D respectively show paths p1 and p2 in the combinatorial circuit of FIGS. 2A and 2B. Under a combinational analysis, all inputs and nodes, a, b, d, e, f, can be set to any combination of logic values. Referring to FIG. 2C, a rising transition on the input of the path p1 cannot be sensitized. Referring to FIG. 2D, a rising transition on the input a of the path p2 can be sensitized. Under a sequential analysis, the node d is recognized as being the complement of the input b. As FIG. 2C shows, a rising transition on the input a of the path p1 cannot be sensitized. As FIG. 2D shows, a rising transition on the input a of the path p2 cannot be sensitized either. Because it is directed to identifying functionally sensitizable paths, sequential analysis typically identifies more paths as being sensitizable than does the combinational analysis.

Having established that unsensitizable paths have no bearing on circuit delay and that an understanding of the logical behavior of the circuit is necessary to identifying a lack of sensitizability, it then becomes advantageous to understand how prevalent paths that are critical versus those that are both critical and unsensitizable can be in a typical IC.

Figure 3A:
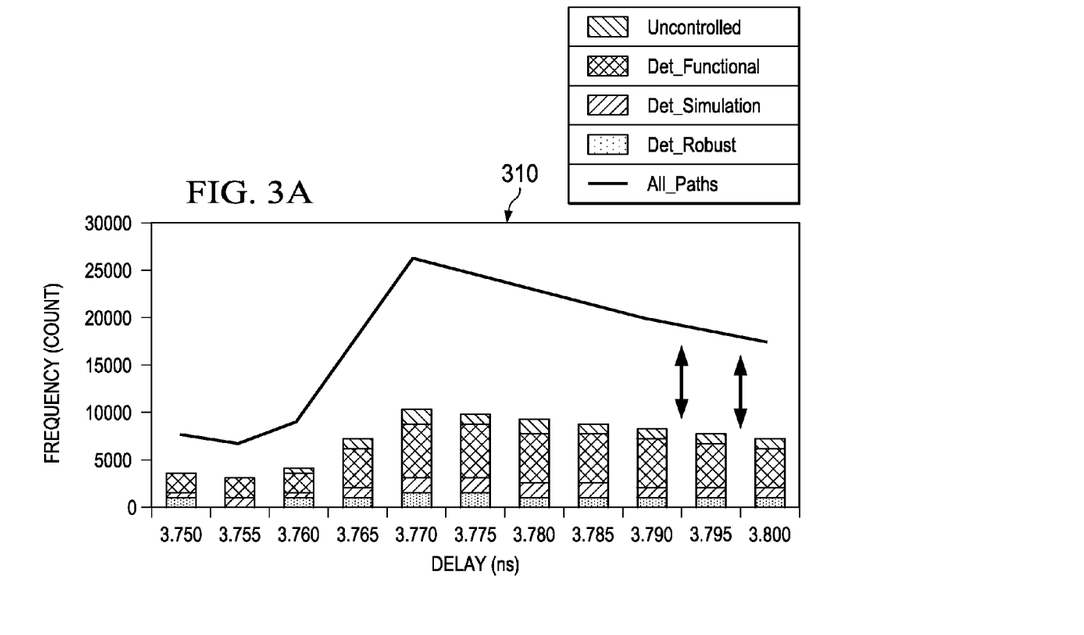
FIGS. 3A-C are graphs illustrating shortcomings of conventional multi-$V_t$ optimization according to a first experiment involving a first example IC.
Figure 3B:
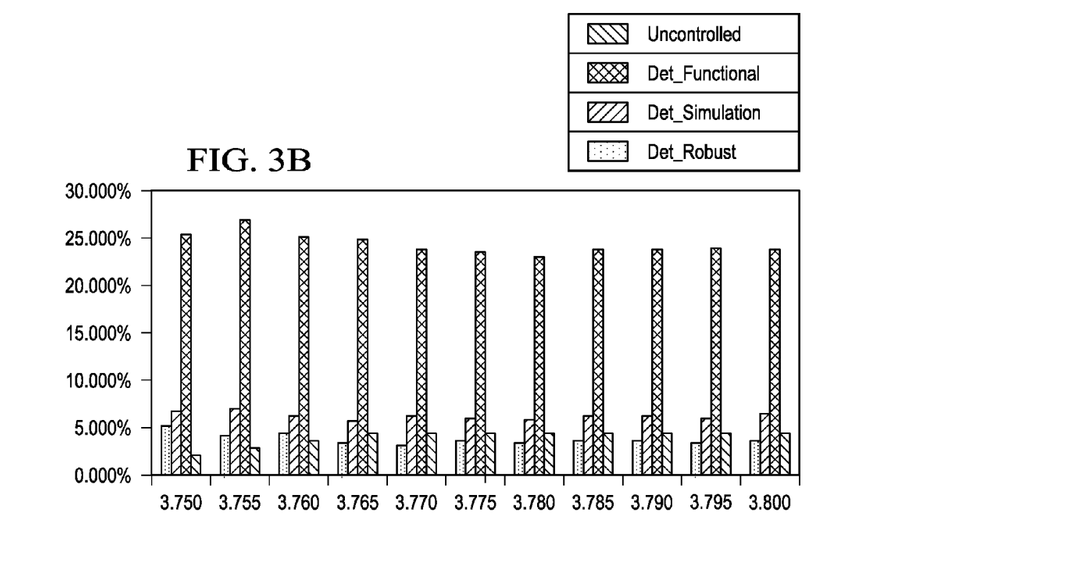
Figure 3C:
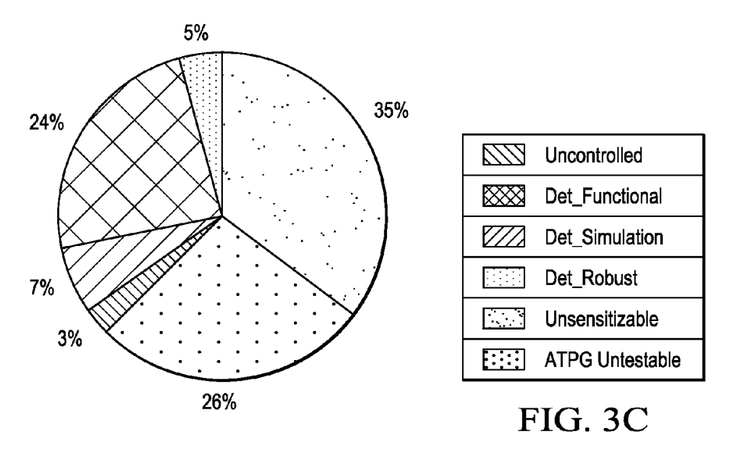

FIGS. 3A-C are graphs illustrating shortcomings of conventional multi-$V_t$ optimization according to a first experiment involving a first example IC. The first example IC has 6000 transistors, 7000 internal interconnects, 100 flip-flops or latches and a total of 503,289 paths. Each flip-flop or latch in the first example IC is associated with a maximum of about 150,000 paths. At a clock period of 3.8 ns, the first example IC was subjected to various tests ("Uncontrolled," "Det_Functional," which applies a sequential analysis, "Det_Simulation" and "Det_Robust," which applies a combinational analysis) using FastScan™, an automatic test pattern generator (ATPG) commercially available from Mentor Graphics of Wilsonville, Oreg., to provide vectors to the IC. The tests identified certain paths as unsensitizable. Delays in the unsensitizable paths were found to range between 3.6 ns and 3.8 ns. Various bars in the graphs of FIGS. 3A and 3B indicate those unsensitizable paths. Arrows 310 illustrate that a gap exists between the number of paths that STA identified as critical and the total number of paths in the IC. The arrows 310 indicate that the gap is substantial. The pie chart of FIG. 3C was generated in part from data taken from the graph of FIG. 3B. Referring specifically to the pie chart of FIG. 3C, the functionally unsensitizable paths include the 35% labeled as unsensitizable and the 26% that the ATPG was unable to test. It is guaranteed that no transitions will propagate along these paths, which represent 61% of all of the paths in the first example IC. Cells lying in these paths but outside the sensitizable paths are eligible to be higher $V_t$.

Figure 4A:
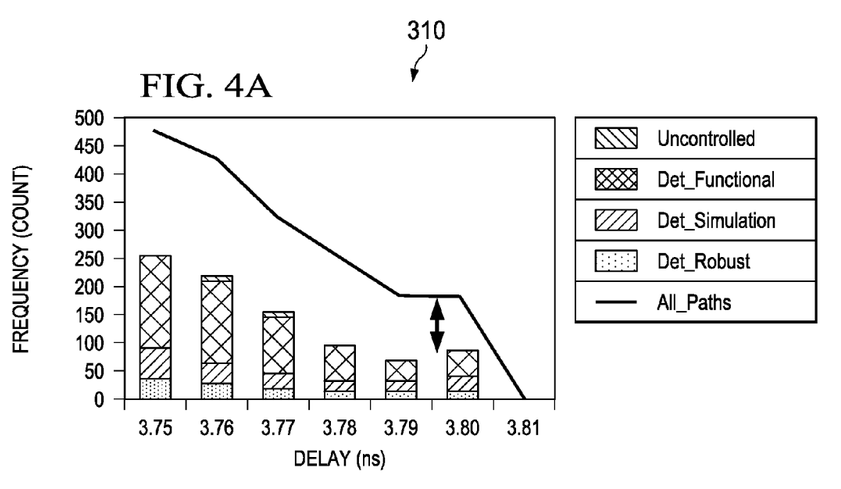
FIGS. 4A-C are graphs illustrating shortcomings of conventional multi-$V_t$ optimization according to a second experiment involving a second example IC.
Figure 4B:
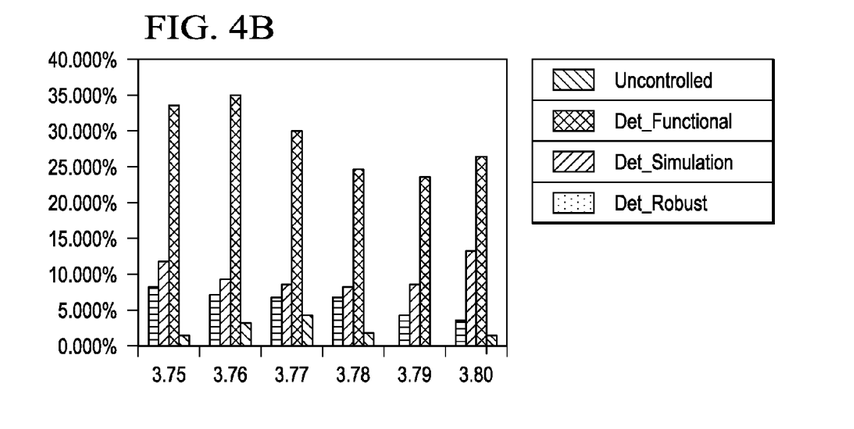
Figure 4C:
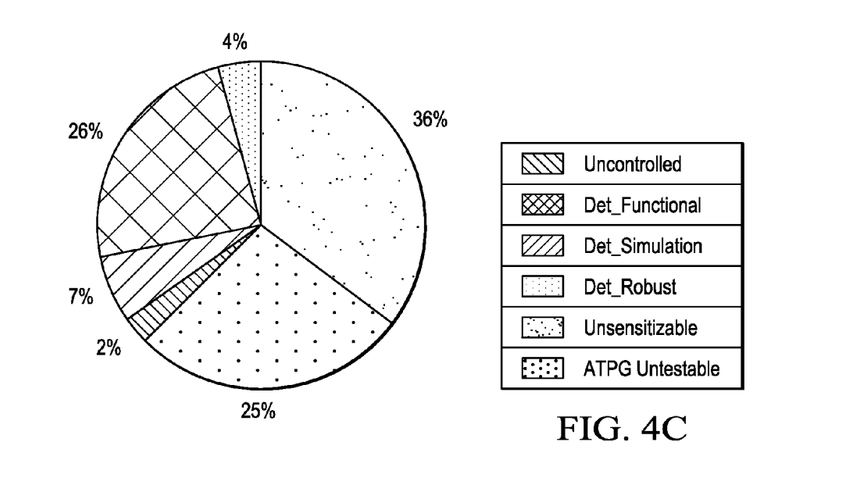

FIGS. 4A-C are graphs illustrating shortcomings of conventional multi-$V_t$ optimization according to a second experiment involving a second example IC. The second example IC has 6000 transistors, 7000 internal interconnects, 100 flip-flops or latches and a total of 149,550 paths. Each flip-flop or latch in the second example IC is associated with a maximum of about 150,000 paths. At a clock period of 3.8 ns, the second example IC was subjected to the Uncontrolled, Det_Functional, Det_Simulation and Det_Robust tests, again using FastScan™. Delays in the sensitizable paths were found to range between 3.45 ns and 3.8 ns. Various bars in the graphs of FIGS. 4A and 4B indicate those sensitized paths. Arrows 410 illustrate that a gap exists between the number of paths that STA identified as critical and the total number of paths in the IC. Again, the arrows 410 indicate that the gap is substantial. The pie chart of FIG. 4C was generated in part from data taken from the graph of FIG. 4B. Referring specifically to the pie chart of FIG. 3C, the functionally unsensitizable paths include the 36% labeled as unsensitizable and the 25% that the ATPG was unable to test. It is guaranteed that no transitions will propagate along these paths, which represent 61% of all of the paths in the second example IC. Again, transistors lying in these paths but outside the sensitizable paths are eligible to be higher $V_t$.

Figure 5:
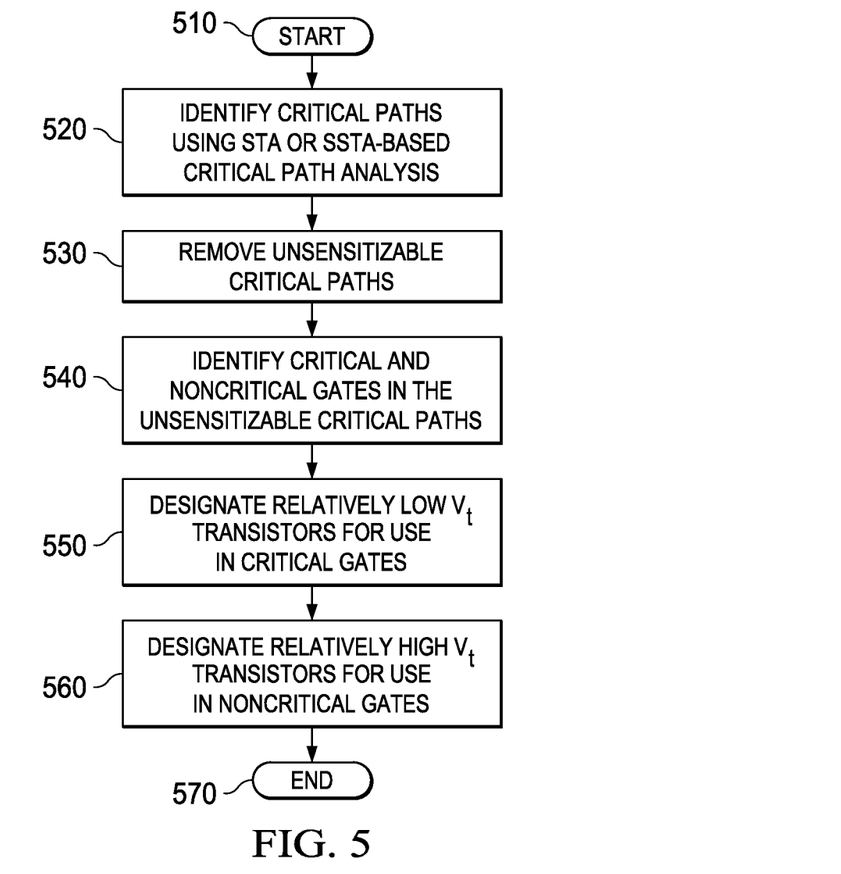
FIG. 5 is a flow diagram of one embodiment of a method of employing unsensitized critical path information to reduce leakage power in a circuit carried out according to the principles of the invention.

FIG. 5 is a flow diagram of one embodiment of a method of employing unsensitized critical path information to reduce leakage power in a circuit carried out according to the principles of the invention. The method begins in a start step 510. In a step 520, critical paths are identified using an STA or an SSTA-based critical path analysis. In a step 530, unsensitizable critical paths are removed using a combinational analysis, a sequential analysis or any other conventional or later-developed analytical technique for identifying sensitizable paths. In a step 540, critical and noncritical gates are identified in the unsensitizable critical paths. In a step 550, relatively low $V_t$ transistors are designated for use in the critical gates. In a step 560, relatively high $V_t$ transistors are designated for use in the noncritical gates. The method ends in a step 570.

Figure 6:
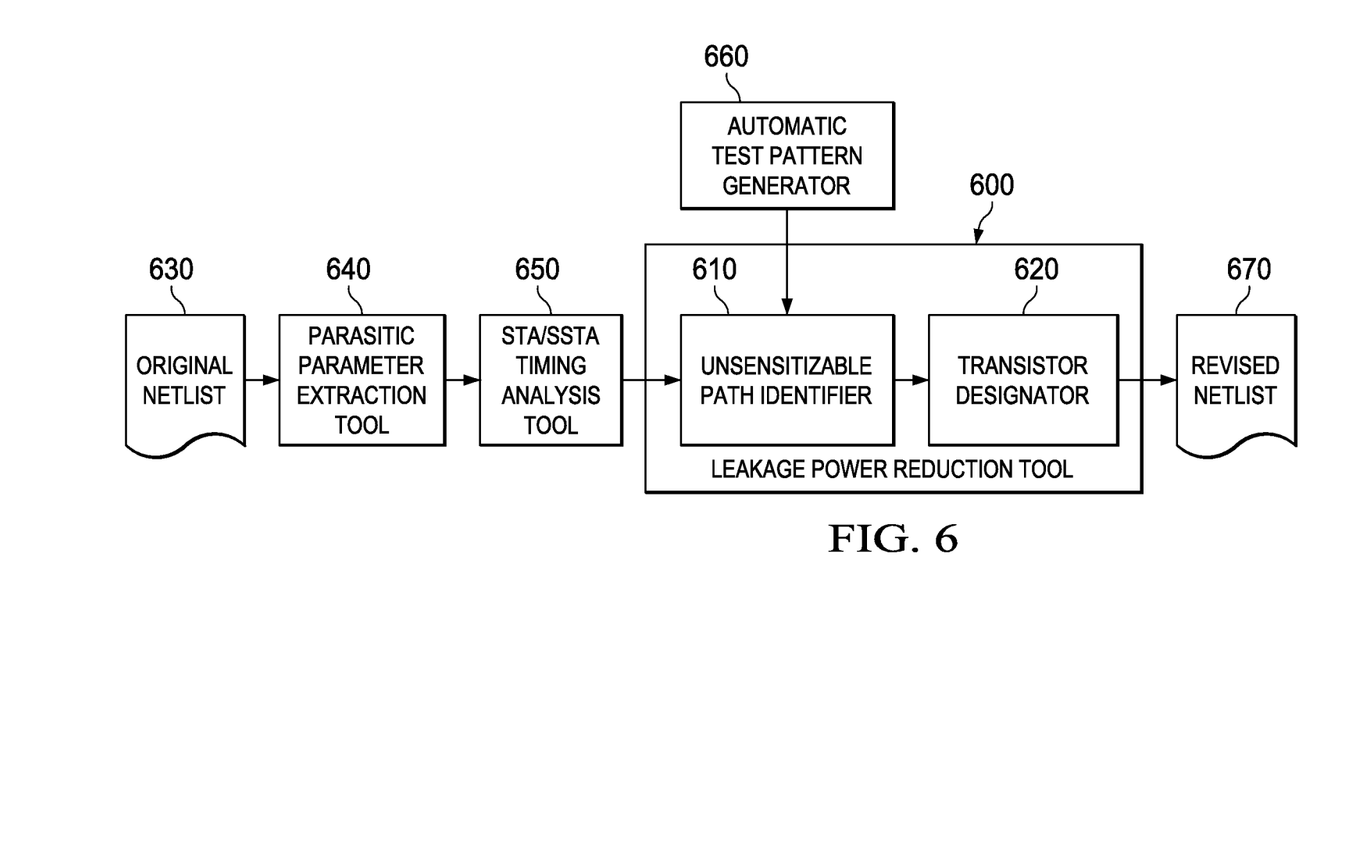
FIG. 6 is a block diagram of one embodiment of an EDA tool for employing unsensitized critical path information to reduce leakage power in a circuit constructed according to the principles of the invention.

FIG. 6 is a block diagram of one embodiment of an EDA leakage power reduction tool 600 for employing unsensitized critical path information to carry out multi-$V_t$ optimization and reduce leakage power in a circuit constructed according to the principles of the invention. The tool 600 includes an unsensitizable path identifier 610 and a transistor designator 620. In the example of FIG. 6, a netlist provides information regarding the circuit that is to undergo multi-$V_t$ optimization. This netlist is referenced as the original netlist 630. A parasitic parameter extraction tool 640 extracts parameters regarding parasitic devices from the original netlist 630. These parameters, along with parameters pertaining to designed devices in the circuit, are provided to an STA or SSTA timing analysis tool 650. The STA or SSTA timing analysis tool 650 performs an STA or SSTA with respect to the circuit, identifying critical paths therein. The unsensitizable path identifier 610 is configured to receive the identified critical paths from the STA or SSTA timing analysis tool 650 and such said information it may need to analyze the logical behavior of the circuit. In the embodiment of FIG. 6, the said information is received from the original netlist 630. The unsensitizable path identifier 610 is configured then to receive vectors from an ATPG 660, and using a combinational analysis, a sequential analysis or any other conventional or later-developed analytical technique, identifies unsensitizable paths in the circuit. The unsensitizable path identifier 610 is configured then to identify critical and noncritical gates in the unsensitizable critical paths. The transistor designator 620 is configured then to designate relatively low $V_t$ transistors for use in the critical gates and designate relatively high $V_t$ transistors are designated for use in the noncritical gates. A revised netlist 670 is then generated in accordance therewith.

Certain embodiments of the invention further relate to computer storage products with a computer-readable medium that have program code thereon for performing various computer-implemented operations that embody the tools or carry out the steps of the methods set forth herein. The media and program code may be those specially designed and constructed for the purposes of the invention, or they may be of the kind well known and available to those having skill in the computer software arts. Examples of computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which the invention relates will appreciate that other and further additions, deletions, substitutions and modifications may be made to the described embodiments without departing from the scope of the invention.

What is claimed is:

1. An electronic design automation tool embodied in program code stored in a non-transitory computer readable storage media, said program code executable by a computer, comprising:
   an unsensitizable path identifier configured to receive information regarding designed devices in a circuit and information regarding identified critical paths in said circuit and identify critical and noncritical gates in unsensitizable paths of said critical paths in said circuit, wherein said noncritical gates in said unsensitizable paths of said critical paths are not gates of a sensitizable path of said critical paths of said circuit; and a transistor designator coupled to said unsensitizable path identifier and configured to designate a first type of transistors for use in said critical gates and designate a second type of transistors for use in said noncritical gates, wherein said first type of transistors have a threshold voltage lower than said second type of transistors.

2. The electronic design automation tool as recited in claim 1 wherein said unsensitizable path identifier is configured to receive said information regarding said designed devices from a netlist.

3. The electronic design automation tool as recited in claim 1 wherein said unsensitizable path identifier is configured to receive vectors from an automatic test pattern generator and employ said vectors to identify said unsensitizable paths.

4. The electronic design automation tool as recited in claim 1 wherein said unsensitizable path identifier is configured to identify said unsensitizable paths of said critical paths using a selected one of:
a combinational analysis, and
a sequential analysis.

5. The electronic design automation tool as recited in claim 1 wherein said transistor designator is further configured to designate said second type of transistors based on transition propagation latencies of said unsensitizable paths of said critical paths.

6. The electronic design automation tool as recited in claim 1 wherein said unsensitizable path identifier is further configured to identify said critical and noncritical gates in unsensitizable paths of noncritical paths of said circuit.

7. The electronic design automation tool as recited in claim 1 wherein said circuit is an integrated circuit.

8. A method of employing unsensitized critical path information to reduce leakage power in a circuit, comprising:
identifying critical and noncritical gates in unsensitizable critical paths of said circuit, wherein said noncritical gates in said unsensitizable paths of said critical paths are not gates of a sensitizable path of said critical paths of said circuit;
designating a first type of transistors for use in said critical gates; and
designating a second type of transistors for use in said noncritical gates, wherein said first type of transistors have a threshold voltage lower than said second type of transistors and wherein said identifying step and said designating steps are executed by a computer.

9. The method as recited in claim 8 further comprising receiving information regarding designed devices in said circuit from a netlist.

10. The method as recited in claim 8 wherein said identifying comprises receiving vectors from an automatic test pattern generator.

11. The method as recited in claim 8 wherein said identifying comprises using a selected one of:
a combinational analysis, and
a sequential analysis.

12. The method as recited in claim 8 wherein said designating said second type of voltage transistors comprises designating said second type of transistors based on transition propagation latencies of said unsensitizable critical paths.

13. The method as recited in claim 8 wherein said identifying comprises identifying said critical and noncritical gates in unsensitizable noncritical paths of said circuit.

14. The method as recited in claim 8 wherein said circuit is an integrated circuit.

15. An electronic design automation tool, embodied in program code stored in a non-transitory computer readable storage media, said program code executable by a computer, comprising:
an unsensitizable path identifier configured to receive information regarding designed devices in an integrated circuit and information regarding critical and noncritical paths in said integrated circuit identified in a timing analysis of said integrated circuit and identify critical and noncritical gates in unsensitizable paths of said critical and noncritical paths of said integrated circuit; and
a transistor designator coupled to said unsensitizable path identifier and configured to designate a first type of transistors for use in said critical gates and designate a second type of transistors for use in said noncritical gates, wherein said first type of transistors have a threshold voltage lower than said second type of transistors, wherein said noncritical gates in said unsensitizable paths of said critical paths are not gates of a sensitizable path of said critical paths of said integrated circuit.

16. The electronic design automation tool as recited in claim 15 wherein said unsensitizable path identifier is configured to receive said information regarding said designed devices from a netlist.

17. The electronic design automation tool as recited in claim 15 wherein said unsensitizable path identifier is configured to receive vectors from an automatic test pattern generator and employ said vectors to identify said unsensitizable paths.

18. The electronic design automation tool as recited in claim 15 wherein said unsensitizable path identifier is configured to identify said unsensitizable paths of said critical paths using a selected one of:
a combinational analysis, and
a sequential analysis.

19. The electronic design automation tool as recited in claim 15 wherein said transistor designator is configured to designate said second type of transistors based on transition propagation latencies of said unsensitizable paths of said critical paths.

20. The electronic design automation tool as recited in claim 15 wherein said electronic design automation tool is embodied in program code stored on a non-transitory computer-readable medium.

* * * * *